United States Patent [19]
Wallenstein

[11] Patent Number: 5,828,424
[45] Date of Patent: Oct. 27, 1998

[54] PROCESS AND APPARATUS FOR GENERATING AT LEAST THREE LASER BEAMS OF DIFFERENT WAVELENGTH FOR THE DISPLAY OF COLOR VIDEO PICTURES

[75] Inventor: Richard Wallenstein, Gruenstadt, Germany

[73] Assignee: LDT GmbH & Co. Laser-Display-Technologie KG, Gera, Germany

[21] Appl. No.: 640,845

[22] PCT Filed: Sep. 6, 1995

[86] PCT No.: PCT/EP95/03501

§ 371 Date: Jul. 5, 1996

§ 102(e) Date: Jul. 5, 1996

[87] PCT Pub. No.: WO96/08116

PCT Pub. Date: Mar. 14, 1996

[30] Foreign Application Priority Data

Sep. 8, 1994 [DE] Germany ............... 44 32 029.9

[51] Int. Cl.⁶ .................................................. H04N 9/31
[52] U.S. Cl. ........................ 348/760; 348/750; 348/754; 372/22
[58] Field of Search .................... 348/750, 756, 348/757, 760, 754; 372/21, 22, 23, 94, 98, 99, 108; 359/330; H04N 9/31

[56] References Cited

U.S. PATENT DOCUMENTS

| 3,818,129 | 6/1974 | Yamamoto . | |
| 5,195,104 | 3/1993 | Geiger et al. | 372/22 |
| 5,295,143 | 3/1994 | Rao et al. . | |
| 5,321,709 | 6/1994 | Beausoleil | 372/22 |
| 5,640,405 | 6/1997 | Wallace et al. | 372/21 |
| 5,659,419 | 8/1997 | Lokai et al. | 372/21 |
| 5,661,595 | 8/1997 | Stamm et al. | 372/22 |

FOREIGN PATENT DOCUMENTS

| 0 084 434 | 7/1983 | European Pat. Off. . |
| 42 19 169 | 12/1992 | Germany . |

*Primary Examiner*—Michael Lee
*Attorney, Agent, or Firm*—McAulay Nissen Goldberg Kiel & Hand, LLP

[57] ABSTRACT

In a process for generating at least three laser beams of different wavelengths for displaying color video pictures, a pulsed laser is used to generate light. The light output of the pulsed laser is released in a pulse and is introduced into a medium with nonlinear optical characteristics for generating a laser beam. In addition to the laser beam generated by excitation, this medium releases an additional laser beam whose frequency is given by the sum or difference frequencies of the exciting laser beam and the excited laser beam due to the nonlinear optical characteristics of the medium. The laser beams generated by the medium in this way and the exciting laser beam are used directly, or after frequency conversion, to display monochromatic partial images of a color video picture. An apparatus according to the invention contains suitable devices for carrying out the process.

17 Claims, 6 Drawing Sheets

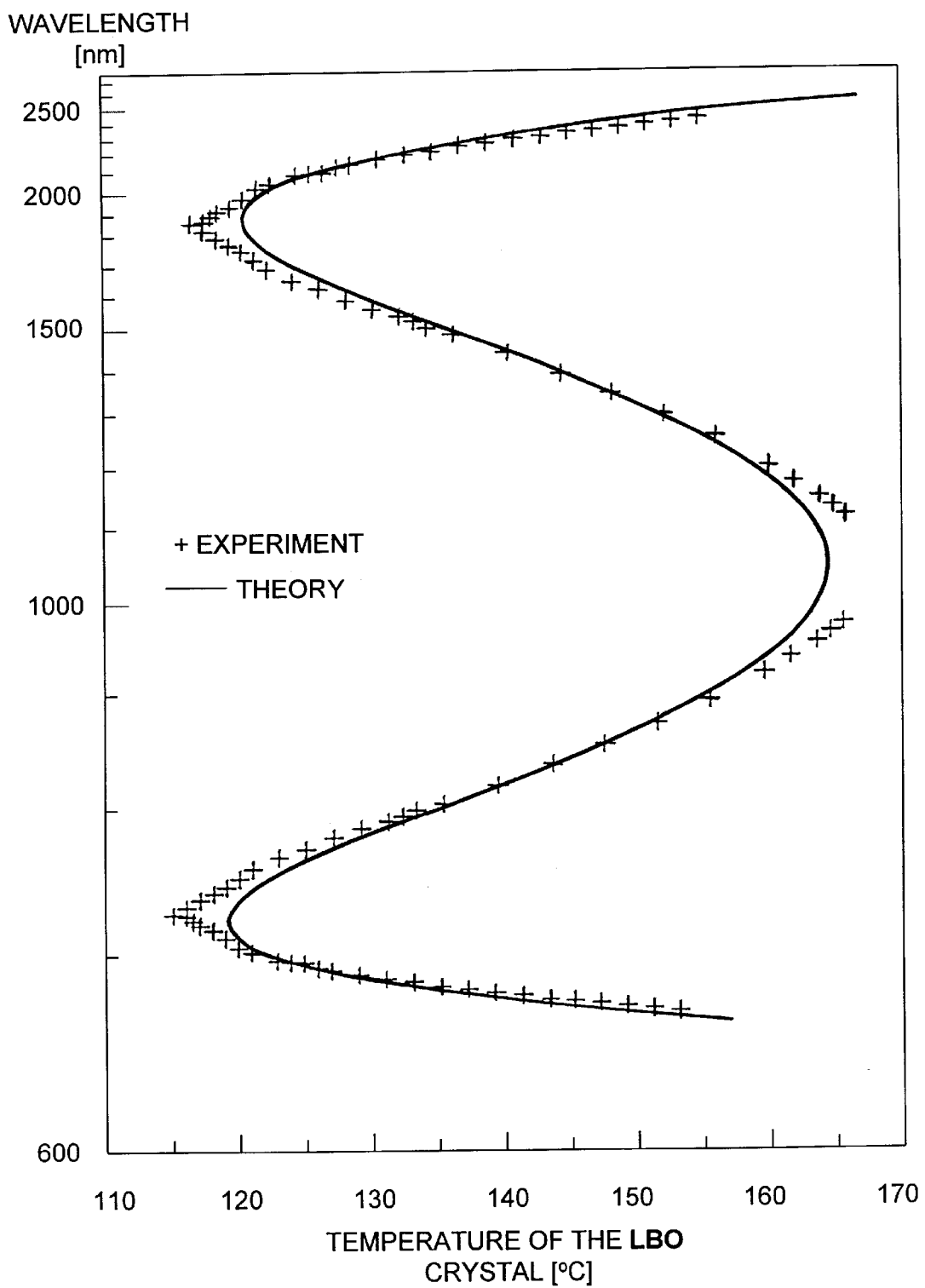
F I G. 3

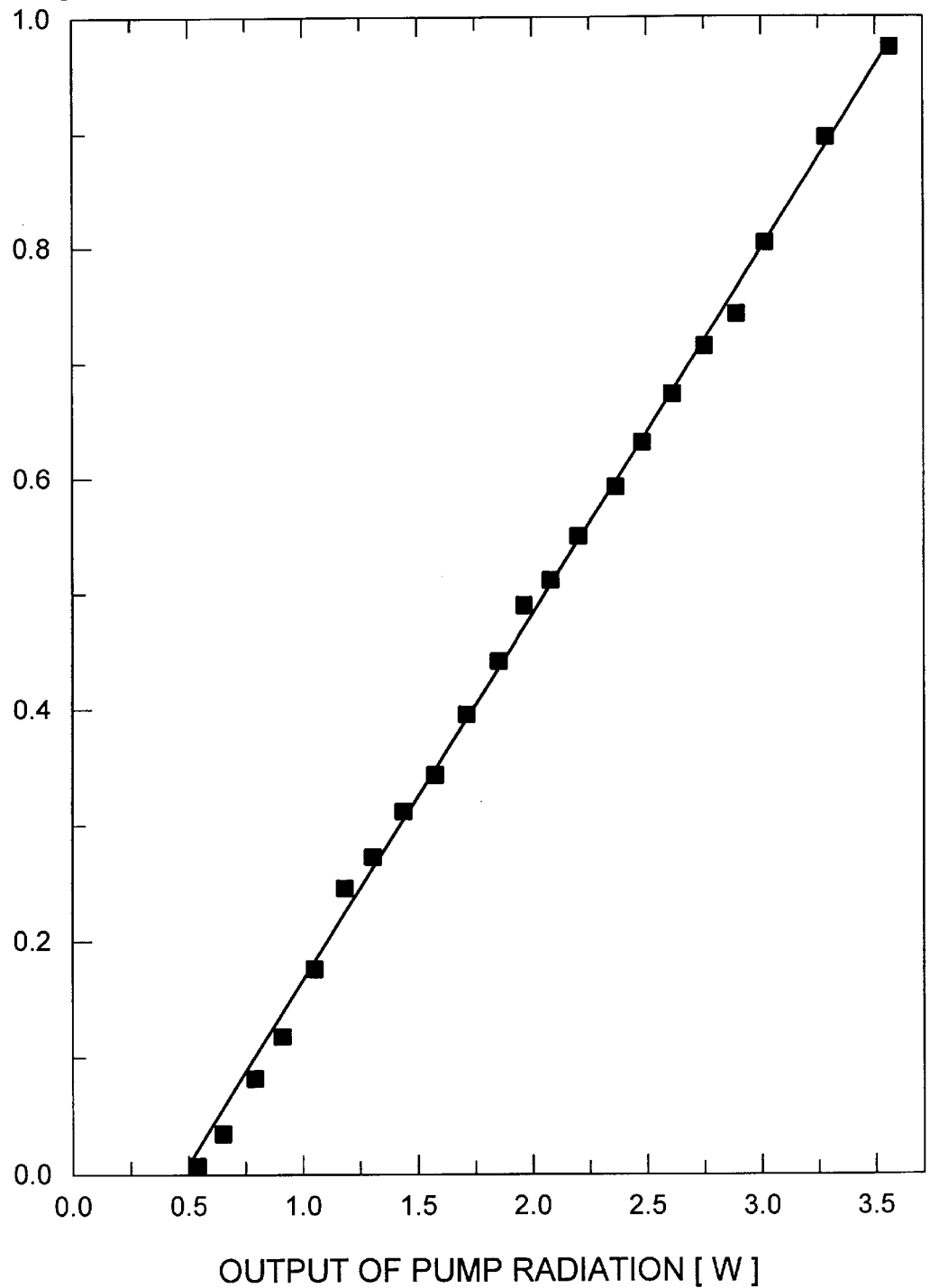
F I G. 4

PROCESS AND APPARATUS FOR GENERATING AT LEAST THREE LASER BEAMS OF DIFFERENT WAVELENGTH FOR THE DISPLAY OF COLOR VIDEO PICTURES

BACKGROUND OF THE INVENTION a) Field of the Invention

The invention is directed to a process for generating at least three laser beams of different wavelengths for displaying color video pictures in which every laser beam is controlled in intensity for generating a monochromatic partial image, and these monochromatic partial images are mixed additively for displaying the color video pictures, wherein at least one of the three laser beams is obtained in that a medium is excited by at least a partial beam of a primary laser with a defined wavelength, which medium, upon excitation, emits a laser beam with a different wavelength than the wavelength of the exciting primary laser, and wherein the exciting laser beam and the excited laser beam are used directly or after frequency conversion for the display of monochromatic partial images. The invention is further directed to an apparatus for generating at least three laser beams of different wavelengths for the display of color video pictures, in particular for carrying out a process of this kind, with a control device for controlling the three laser beams for generating monochromatic partial images which are mixed additively for displaying the color video picture, and the apparatus has a primary laser and a medium which can be excited by means of the latter, wherein the exciting laser beam and the excited laser beam can be used directly or after frequency conversion for displaying monochromatic partial images.

b) Description of the Related Art

Large-area high-brilliance display systems and projection systems cannot be realized by means of conventional image reproduction techniques, especially using picture tubes, since the picture screens are too heavy or are mechanically unstable due to the vacuum requirements.

It was proposed some time ago to image video pictures on a screen by means of lasers. For this purpose, the laser beams are rastered on a screen by means of a deflection device which is realized, for example, by rapidly moving rotating mirrors and swiveling mirrors or by acousto-optical modulators, so that a quantity of image points which are adjacent to one another and in lines situated one above the other are illuminated on the screen by the laser light. The light intensity of the lasers is modulated in accordance with the brightness to be illuminated for each image point. Thus, the imaging principle is the same as that used in picture tubes, where the laser beam is substituted for the electron beam and the mirrors or acousto-optical modulators are substituted for the deflection device. A system of this kind is described in DE 43 06 797 C, for example.

However, three laser beams must be used for color images. The outlay for three lasers is very high, chiefly when gas lasers are used. If this laser video technique is ever to be made available in the consumer market, the cost of such lasers must be reduced in particular.

Further, U.S. Pat. No. 5,317,348 A proposes the use of semiconductor lasers or diode-pumped solid state lasers. For example, a Nd:YAG laser which is pumped with a GaAIAs diode and with a wavelength of 531 nm can be used for producing the green laser beam. Alternatively, it is suggested to operate the YAG laser with reference to a wavelength of the emitted laser beam of 1064 nm and to convert this wavelength by means of a frequency doubler for a wavelength of 532 nm for green. However, frequency doubling involves the risk of output losses.

The video device shown in this patent also requires, in principle, three lasers for generating the three laser beams. Although costs are reduced through the use of diode-pumped solid state lasers, it would be desirable if a plurality of laser beams used in the video device could be generated by a common laser, since this could be expected to further reduce costs.

In addition, EP 0 084 434 A, which describes the prior art mentioned above, proposes the use of an individual argon ion laser as primary laser for generating a blue and a green laser beam. A dye laser is excited by a portion of the green beam so as to generate, in addition, a red laser beam component along with it.

However, according to this patent, it is again necessary to use an expensive argon ion laser which also requires additional cooling due to the low conversion ratio. The additional components such as dye lasers, filters, prisms and polarizers likewise increase cost.

Although, the primary argon ion laser could be replaced by a diode-pumped solid state laser, this might severely limit the accessible wavelength range. That is, it is advisable in a color video system to achieve a high white-light density. This means that in order to find the wavelengths for displaying red, green and blue the three different color components should have approximately the same intensity, since the laser beam with the lowest intensity for white would otherwise limit the maximum possible output of the other laser beams. With sharply different outputs, the laser output of the primary laser would have to be very high to achieve the same luminosity, which would involve additional expenditure, e.g., for cooling. Moreover, an overdimensioning of the optical elements might be necessary for a long service life, which would also cut into the savings in cost achieved by generating a plurality of laser beams by means of an individual primary laser source.

OBJECT AND SUMMARY OF THE INVENTION

The primary object of the present invention is to provide a process and apparatus for displaying a color video picture by means of lasers in which the cost for the laser sources is appreciably reduced.

Based on the generic process, this object is met in that a pulsed laser is used as the primary laser and a material with nonlinear optical characteristics is used as a medium, wherein this material, in addition to the laser beam generated by its excitation, releases an additional laser beam whose frequency is given by the sum or difference of the frequencies of the exciting laser beam and the excited laser beam, and in that the laser beams emitted by the medium are used directly as laser beams for the display of monochromatic partial images or are converted into these laser beams.

Thus, according to the invention, at least two laser beams are generated in the medium. This is made possible in that a nonlinear optical medium is used instead of the dye of the dye laser mentioned in the introduction. Due to the nonlinear optical characteristics, the laser beams which are generated proceeding from the medium have a frequency given by the sum or difference of the excited laser beam. Therefore, at least two of the laser wavelengths needed to display a color video picture can be generated at the same time in such a material. Accordingly, expenditure is appreciably reduced compared with the prior art.

However, the material constants reproducing the nonlinear optical effect are generally small so that a high intensity can obviously not be expected. However, due to the nonlinear characteristics, the intensities for the additional laser beam increase sharply with the field strength of the exciting laser beam. For this reason, pulsed operation is provided for excitation, where outputs of several kilowatts up to the gigawatt range can occur in a pulse. As experience has shown, conversion factors of up to 50% of the exciting laser beams can be achieved in the kilowatt range.

As a result of the pulsed operation, the output per time unit is reduced during output peaks so that the optical components are loaded only slightly, which advantageously manifests itself, with respect to the operation of a device, above all in low maintenance and uniform picture quality over long periods of time.

Further, the pulses reduce the time coherence of the laser beams. As is known from wave theory, a frequency spectrum always results instead of an individual wave in the case of a short wave train. This effect can be utilized to reduce speckle in the video picture.

In the field of laser video, speckle refers to disturbing sparkling points which are formed along interference maxima due to the coherence characteristics of the laser beam. However, in a broadened frequency spectrum such interference maxima are blurred, since the locations of the speckle differ at every frequency in the spectrum. Therefore, speckle is always reduced by means of the short pulse duration.

The pulses lead to another positive secondary effect in video pictures which are rastered as image points as is known, for instance, in television technology with picture tubes and as was also mentioned in the prior art for video systems with lasers which was cited in the introduction. The sharpness of an individual image point depends upon the pulse edge steepness by which the image point can be modulated. If the laser were to be operated in continuous-wave operation, this pulse edge steepness would be substantially limited by the modulator and the cutoff frequency of the amplifier driving the latter. With very short laser pulses, on the other hand, the edge steepness is dominated by the pulse duration. Therefore, amplifiers with a lower cutoff frequency can also be used with pulsed lasers for modulation so as to reduce cost.

It follows from the foregoing that the shorter the short pulse duration, the more advantageous it is. Therefore, in a preferred further development of the invention the exciting laser is pulsed at a pulse duration of less than 100 ps, which forms an upper limit as is shown by practical tests.

In another advantageous further development of the invention, the exciting lasers, with respect to wavelength, and the medium are so selected that when assigning the colors red, green and blue to the wavelengths of the three laser beams which are generated for displaying the monochromatic partial images the wavelength of the generated blue laser beam is between 400 nm and 470 nm, the wavelength of the generated green laser beam lies in the range of 520 nm to 540 nm, and the wavelength of the generated red laser beam is less than 635 nm, wherein the outputs of the laser beams over the pulse duration with the colors red and blue do not deviate by more than 30% from the output of the green laser beam.

As a result of this selection, a high white-light density is achieved in color video pictures, wherein virtually the entire laser output is made use of for generating a white image point of maximum brightness. Accordingly, the materials and the exciting laser, as well as the means for conversion, if any, can be selected for a lower output. The expenditure on possible additional cooling is likewise reduced in that such cooling means will have a low output or can even be dispensed with entirely.

These advantages are achieved in a simple manner in particular in a preferable further development of the invention in that the excitation is effected via the fundamental frequency or an upper harmonic of a mode-coupled Nd:YLF laser or Nd:YVO$_4$ laser.

In another preferred further development of the invention, the selection of the material for the medium and the positioning of the medium and mirrors for the phase-matched coupling in of the exciting laser beam and emitted laser beam are effected so as to result in the design of an optical parametric oscillator.

Such optical parametric oscillators are known, for example, from DE 42 19 169 A. In this reference, the material used is a crystal in which a signal beam can be excited by a primary laser. Due to the nonlinear optical characteristics of the crystal, the entering laser beam is split into two waves, the sum of whose frequencies gives the frequency of the entering laser beam. The additional beam generated in this way in addition to the signal beam is referred to as an "idler beam".

Optical parametric oscillators have the advantage that the frequencies of the signal beam and idler beam can also be adjusted by changing the crystal direction relative to the entering wave. Accordingly, the wavelengths of the laser beams generated in the medium can be selected and adjusted in a particularly simple manner with respect to an optimal white-light density.

As in the case of lasers, the mirrors serve to generate standing waves for stimulated emission. For advantageous pulsed operation, it must be taken into account in the dimensioning of the mirror system that the waves of a first pulse are coupled with those of the following pulse in the same phase in order to achieve advantageous operation.

However, the wavelengths of the excited beam can also depend on other physical parameters such as temperature.

In order to maintain stable conditions in this respect, an advantageous further development provides that the temperature of the medium is regulated. The required regulating accuracy should lie in the range of 1° C.

In another preferred further development of the invention, the wavelength of the excited laser beam is adjusted via the temperature of the medium. Accordingly, the temperature dependence of some media are made use of in order to fix the wavelengths of the excited beam and the additional beam. This is advantageous because the crystal direction need not be precisely maintained in an optical parametric oscillator when the wavelengths are readjusted by adjusting the temperature. Stable operation can then be achieved over a longer period without color distortions. These color distortions could occur if the wavelengths were adjusted exclusively via the crystal direction due to slight changes in the crystal, e.g., changes in its angle due to shocks, but can be compensated for to a limited degree in a simple manner by regulating the temperature.

The laser beams used to display the monochrome partial images can be obtained, e.g., by converting the exciting laser beams or the laser beams generated in the material. It is also possible to generate laser beams of short wavelength and to use dye lasers for conversion.

However, cost is reduced in particular according to an advantageous further development of the invention in that the exciting laser beams and/or the laser beams generated in the medium by the exciting laser beams are frequency-multiplied for conversion or frequency-summed with another laser beam.

Since the laser beams are pulsed according to the invention, that is, since there is a high field strength of the exciting laser light, this kind of conversion by means of nonlinear optical materials is especially effective. In so doing, additional dye lasers are economized on.

In another preferred further development of the invention, the pulse duration of the laser beams is so adjusted that the generated wavelength spectrum in the laser beam cancels out interference of the laser beam with itself. Accordingly, as was already mentioned, speckle can be advantageously reduced below the limit of observation.

For example, the pulse duration can be selected in such a way that the broadening of the wavelength spectrum averages out the speckle. The pulse duration can be calculated for the case at hand by the equations known from wave optics. However, based on Huygens' principle, the behavior of every spherical wave in every location through which the laser beams pass is to be taken into account in the calculation so that no general value can be indicated for the most favorable pulse duration in the individual instance. However, practical tests with a laser beam which was generated at a distance of 2 m from a screen and had a diameter of 2 mm no longer exhibited any speckle structure at a pulse duration of 1 ps, so that this value can be used as a point of reference for other dimensioning.

In another advantageous further development of the invention, the monochromatic partial images are generated by sequential mastering of the image as image points at a predetermined image point frequency and the pulses of the exciting laser beam are repeated at a repetition frequency which is an integral multiple of the image point frequency. In this instance, the sharpness of the image points which is given by a short pulse duration is made use of in an advantageous manner.

Since the repetition frequency is an integral multiple of the image point frequency, there is an identical number of pulses in every image point. This packet of pulses also always has a steep leading edge and a steep trailing edge, which particularly benefits the sharpness of the image points. Further, a flickering of the image is also advantageously prevented in that the quantity of pulses in the image point is also always the same in this type of synchronization.

Further, the invention is directed to an apparatus of the type mentioned above which is characterized in that the primary laser can be operated in a pulsed manner in such a way that its light output is released in a pulse and the medium is a material with nonlinear optical characteristics which, in addition to the laser beam excited by the primary laser beam, also releases another laser beam whose frequency is given by the nonlinear optical characteristics of the material as a sum or difference frequency of the primary laser beam and excited laser beam.

Preferred further developments of the apparatus according to the invention also follow from the use of the following features (individually or in combination):

mirrors are provided for the phase-matched coupling in of the excited laser beams and the emitted laser beams relative to the medium, the medium is a nonlinear optical crystal, and crystals and mirrors are arranged, with reference to the primary laser, in the manner of an optical parametric oscillator;

a regulating device is provided for regulating the temperature of the medium;

the regulating device is adjustable with respect to the temperature to be regulated and the wavelength of the laser beam which is excited by the medium is not dependent upon temperature;

frequency multipliers or sum frequency mixers are provided for converting the laser beams;

a deflection device is provided for generating the monochromatic partial images in an image point raster with an image point frequency and a pulse device is provided for the primary laser which pulses the laser at a repetition frequency which is an integral multiple of the image point frequency.

All of these further developments of the apparatus have the same advantages that were mentioned above with reference to the process.

In another further development of the invention, a self-modulating optical medium is provided in at least one of the light paths of the lasers. This can be realized in particular by a light-conducting fiber. In this way, the frequency spectrum of the wavelengths of the lasers can be broadened further so that speckle can be suppressed more effectively than is possible by means of short pulse duration by itself Assuming an input pulse with a pulse duration of 20 ps, a repetition rate of 100 MHz, and a mean output of 1 W, a spectral width of 1 nm results in a light-conducting fiber with a length of 11 m due to the self-modulation. Further, there also occurs a group-velocity dispersion which further increases the spectral width so that shorter light-conducting fibers can also be used in practice in order to reduce speckle in an effective manner by means of this effect.

With reference to the drawing, by way of example, the invention is explained more fully in the following in principle.

BRIEF DESCRIPTION OF THE DRAWINGS

In the drawings:

FIG. 3 shows the temperature dependence of the wavelengths of the excited beam, that of the signal beam, and that of the additional beam, the idler beam, in the laser beam source according to FIG. 2;

FIG. 4 is a graph showing the output of the idler radiation with a wavelength of 1240 nm as a function of the pump output in the embodiment example according to FIG. 2;

DESCRIPTION OF THE PREFERRED EMBODIMENTS

Figure 1:
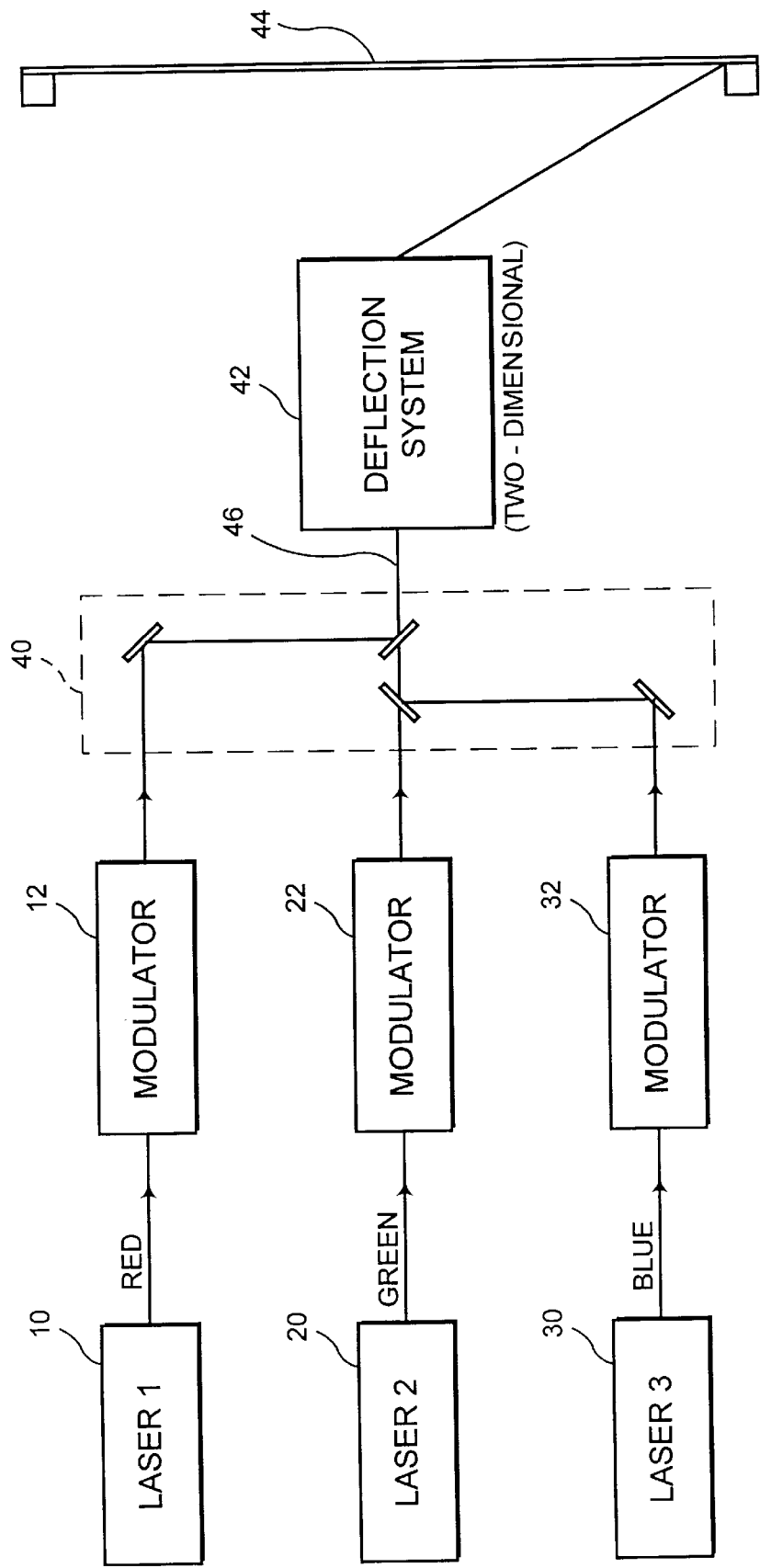
FIG. 1 shows a schematic view of a known apparatus for generating color video pictures by means of laser beams.

The principle of a known video system is illustrated with reference to FIG. 1. Three lasers 10, 20, 30, conventionally with laser wavelengths which correspond to the colors red, green and blue on the spectral curve in the CIE chart, are used to display monochromatic partial images. These laser beams which are emitted by the lasers 10, 20, 30 are modulated in amplitude by modulators 12, 22, 32 with the respective color intensity which is suitable for the image point to be illuminated on a screen for displaying these colors. The three laser beams are subsequently combined in a mirror system or prism system 40 to form an individual collinear parallel light bundle which is projected onto a screen 44 by a deflection device 42.

According to the invention, the laser beams are pulsed at a suitable repetition rate. In order to prevent flickering, it is advisable to show the same quantity of pulses per image point, that is, to generate the pulses at a repetition frequency which is an integral multiple of the image point frequency. The steepness of the pulse is then the dominating factor for the edges in the display of an image point and the selected cutoff frequencies of the modulators 12, 22 and 32 need not be extremely high. In accordance with the sampling theorem, it is sufficient to double the image point frequency.

In order to reduce speckle, pulse lengths in the region of 1 ps are especially essential, as will be discussed in more detail hereinafter. However, in the case of pulsed laser beams the spectral region can be further increased in that a so-called frequency chirp is impressed on the laser beam. This broadening occurs when passing through material due to the self-phased modulation. In addition, a group-velocity dispersion also contributes to the broadening in the laser beam. For example, in order to make use of this effect, a light-conducting fiber with a length of approximately 10 m is inserted at the location designated by 46.

The laser beam source which will be described in the following with reference to FIG. 2 replaces the three lasers 10, 20, 30 in the basic diagram shown in FIG. 1. The laser source simultaneously generates a pulsed red laser beam 50 with a wavelength of 620 nm, a pulsed green laser light beam 52 with a wavelength of 526.5 nm, and a pulsed blue light beam with a wavelength of 457.5 nm.

A mode-coupled Nd:YLF laser 56 which generates light pulses with a wavelength of 1053 nm or 1047 nm is provided for excitation. The pulse duration is typically 30–50 ps at a repetition frequency lying between 70 and 100 MHz, which results in a mean output in the range of 20–30 W in conventional systems.

Further, a frequency doubler 58 which can be formed of a noncritical phase-matched crystal of lithium triborate, for instance, is provided. The laser beam with a wavelength of 1053 nm which is emitted by laser 56 is converted by the frequency doubler 58 into a laser beam with a wavelength of 526.5.

The conversion efficiency of such frequency doublers 58 is very high in pulsed operation and can be as high as 50%. Therefore, these frequency doublers 58 can be used in systems such as those described in the following without considerable output losses for generating the laser beams for a color video system.

A laser beam with a wavelength of 915 nm and another laser beam with a wavelength of 1240 nm are excited by means of the green laser beam in a nonlinear optical medium, which is a crystal 60 in the embodiment example. The sum of the frequencies of the excited laser beams is equal to the frequency of the exciting laser beam.

Figure 2:
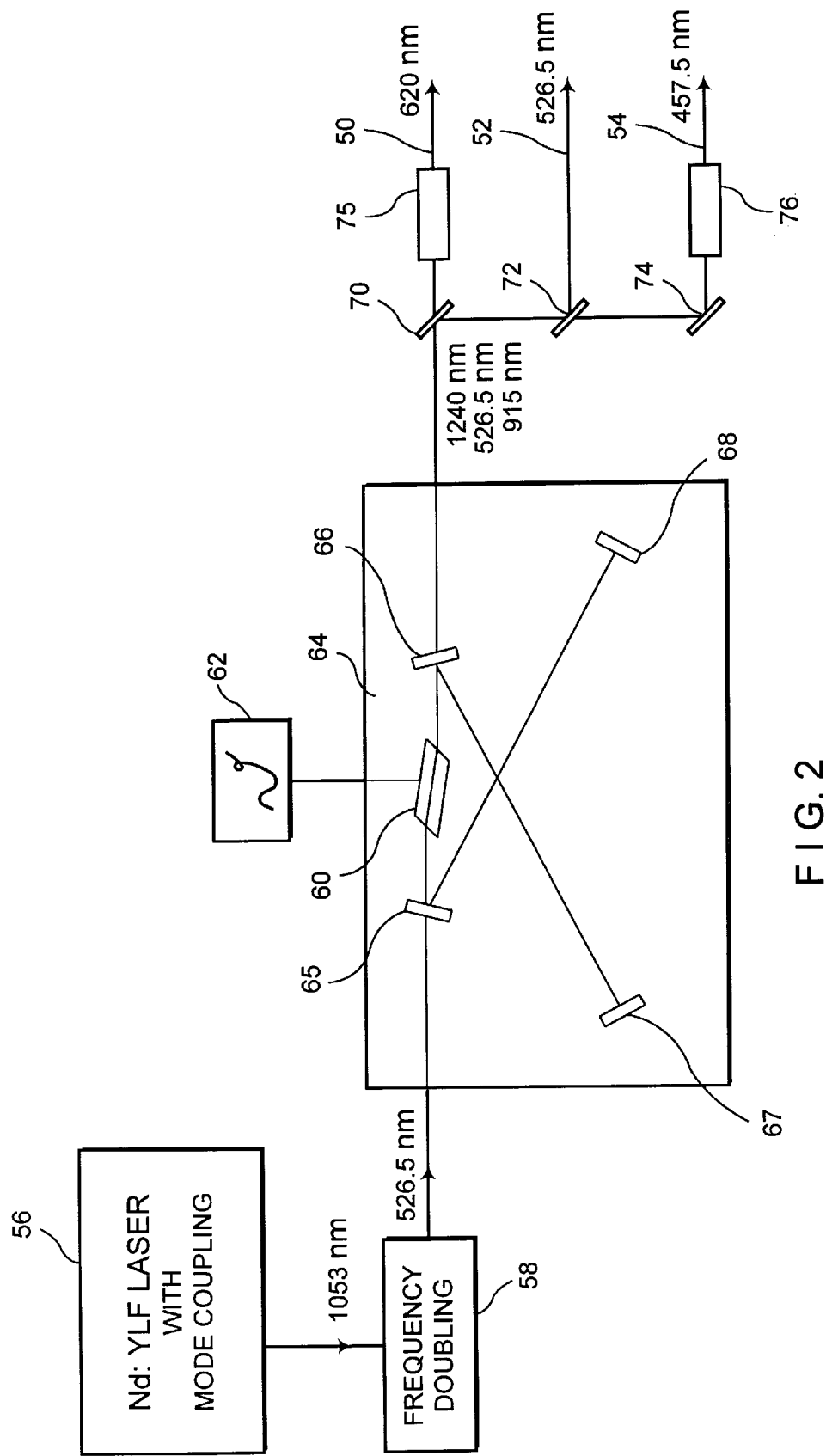
FIG. 2 shows an embodiment example of a laser beam source for an apparatus according to the invention.

In the example shown in FIG. 2, the excited laser beam and the additional laser beam were generated in a construction such as that known from optical parametric oscillators (OPO). Due to the nonlinear optical characteristics of the crystal 60, two laser beams, namely, the so-called signal beam and idler beam, are generated in addition by means of an incident laser beam. The frequency of these two beams depends on the crystal direction.

Lithium triborate, whose wavelengths can also be adjusted via temperature, is used as material for the crystal. For this reason, in the schematic drawing shown in FIG. 2, it is also thermally coupled to a regulating device 62 which maintains the temperature constant at 153° C.

Further, the temperature of the crystal 60 can be adjusted via the regulating device 62 so that the wavelengths of the laser beams generated in the crystal 60 are optional in principle. In the embodiment example, this adjustability was made use of to stabilize the OPO 64 which is realized by means of the crystal 60 so that a high image quality, which could change, for instance, because the crystal no longer lies in the most favorable position with respect to the crystal direction relative to the incident laser beam after a certain period of time, can still be achieved during extended operation of a video device. The light intensity of the signal beam which is filtered out of the common laser beam is used as a reference value for stabilization. However, the idler beam or a combination of the intensities of the idler beam and signal beam could also be used in the same way.

The OPO 64 shown in FIG. 2 works with noncritical phase matching and is pumped synchronously with the Nd:YLF laser. Reference is made to the literature cited in the introduction for details of the OPO and its design.

In the example shown in FIG. 2, the resonator is formed by mirrors 65, 66, 67, 68. The schematic arrangement of the resonator substantially shows the design used in the embodiment example.

The three laser beams, the exciting beam, the excited beam, and the additional beam, are unified in the output of the OPO 64 to form a common light bundle which is divided into the individual laser beams by means of dichroic mirrors 70, 72 and 74. Instead of dichroic mirrors, it is also possible to use mirrors with thin coats which reflect light at determined wavelengths due to the interference occurring in the thin coats, but which allow light at other wavelengths to pass through.

The coupled-out signal beam with a wavelength of 915 nm and the idler beam with the wavelength 1240 nm are frequency-doubled in each instance via another nonlinear optical crystal 75 and 76 so that laser beams with wavelengths of 457.5 nm for blue, 526.5 nm for green, and 620 nm for red are available at the output of the laser source, according to FIG. 2, for displaying color video pictures.

The output proportions achieved in the embodiment example were 100% for red, 106.9% for green and 79.2% for blue so that a high white-light density of 1.29 is achieved. Accordingly, bright color video pictures can be displayed without the need for increased expenditure on cooling as a result of losses due to the conversion of the laser beam from the primary laser source 56. In general, estimates show that this advantage is achieved when the wavelength of the blue laser beam is between 400 nm and 470 nm, the green laser beam has a wavelength between 520 nm and 540 nm, and the wavelength of the red laser beam is less than 635 nm, wherein the output of the laser beams over the pulse duration with the colors red and blue does not deviate from that of the green laser beam by more than 30%.

FIG. 3 shows the dependence of the wavelength of the signal beam and idler beam of a LBO OPO, which is excited by radiation with a wavelength of 526.5 nm, upon the temperature of the LBO crystal 60. At a temperature of 153° C., as was used in the embodiment example shown in FIG. 2, the wavelengths of 1240 nm and 915 nm indicated above resulted for the excited beam and the additional beam. When the temperature changes by 2° C. to 151° C., wavelengths of 904 nm and 1260 nm result. In this case, the output proportions for the red, green and blue laser light are 100% (red), 86% (green), and 59% (blue), giving a relative white-light density of 0.99.

This example shows that a practically optimum color video display can be achieved with the wavelengths used in the embodiment example in FIG. 2. It further shows that temperature regulation with a regulating accuracy of better than 1° C. should be achieved for optimum operation. Moreover, the great change in the white-light density clearly shows that the actual value used for regulating temperature should preferably be taken from the output of the generated laser beams for high uniform image quality.

FIG. 4 shows the output of the idler beam (1240 nm) as a function of the output (pump radiation) of the exciting laser beam (526.5 nm). In judging the measurement values shown in the drawing, it must be borne in mind that the mean output is plotted in this figure. The data were obtained with exciting laser pulses having a duration of approximately 50 ps and a repetition rate of 75 MHz. This means that the outputs in the pulse lie in the kilowatt range; that is, the exciting laser beam has a sufficiently high field strength for a dominance of nonlinear optical parameters of the medium.

The measurement curve in FIG. 4 shows that an idler beam with an output of 1 W is possible at an exciting output of 3.5 W.

In the embodiment example shown previously, an optically excited Nd:YLF laser was used. Conventional Nd:laser systems are pumped by arc lamps. However, high-output diode lasers for pumping solid state lasers are also known. The optical efficiency of these known lasers is typically 10 to 20% and more than 5% overall electrical efficiency can be achieved. Therefore, for a laser output of 30 W, a maximum output of approximately 600 W is required. This output is lower by several orders of magnitude than the connection output for high-output lasers which emit visible light in the watt range. Diode-pumped solid state lasers of the type mentioned above do not require expensive water cooling and air cooling is generally sufficient.

The frequency doubling of the output signal of the mode-coupled Nd:YLF laser with a mean output of 30 W generates green laser radiation with an output of at least 10 W. Outputs of 2 to 3 W can be obtained for the signal beam and idler beam with this exciting radiation, namely, the pump radiation for the synchronously pumped LBO OPO. Due to the high pulse output of several kilowatts, approximately 50% of this output can be used with subsequent frequency doubling via the crystals 75 and 76. The output of the green laser light which is not converted in the OPO is more than 2 W. These outputs are more than sufficient for displaying color video pictures in the consumer area with image diagonals of 2 m.

It is to be expected that the conversion ratio can be increased even further with short pulses in the range of 1 ps. Such short pulses are particularly desired for the reduction of speckle, that is, the unwanted interference of the imaging coherent laser beams when displaying video pictures. Very short pulses mean a broadening of the frequency spectrum of the coherent laser radiation. The wavelength spectrum associated with this leads to a blurring of speckles. Thus, the speckles disappear when the wavelength spectrum is very wide. As is known from wave optics, the width is inversely proportional to the length of a wave train, that is, the pulse duration.

In addition, some tests were conducted in which a light bundle was directed to a screen at a distance of 2 meters. The point illuminated on the screen was recorded with a CCD camera and the pulse heights in the diagrams shown in FIG. 5 were plotted as a function of the location along the beam diameter.

Figure 5A:
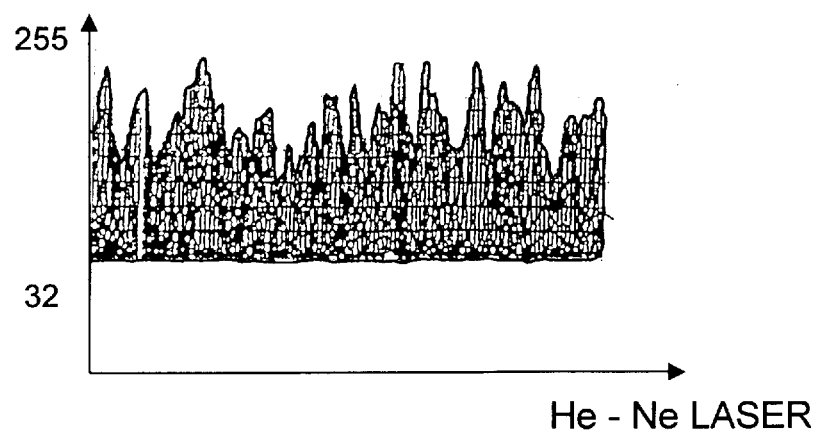
FIG. 5 is a graph showing the results of tests for speckle reduction.
Figure 5B:
Figure 5C:
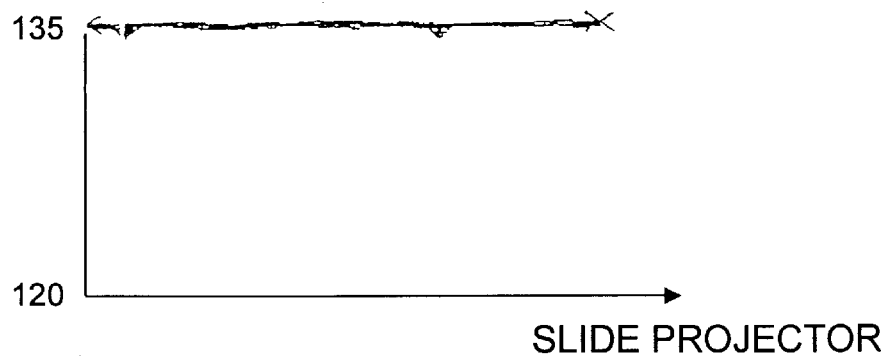

In the top graph in FIG. 5, a He—Ne laser in continuous-wave operation is directed onto a screen and measured. The discernable intensity maxima and intensity minima form the unwanted speckle.

The next graph in FIG. 5 shows the results of a test in which the light beam from a KTP OPO, which was pulsed with a pulse duration of 1 ps, was directed onto a screen and measured. The intensity structure is clearly flatter. In comparing the graphs it should be noted that the intensity scale in the upper graph extends between 0 and 255, while the middle graph was plotted from 34 to 78. The intensity maxima in the middle graph vary only within the range of 2 bits; that is, they lie in the neighborhood of the resolution of the converter. The speckles are practically suppressed.

The bottom graph of FIG. 5 shows the results when using a slide projector as a light source. The lowest measurement curve is flatter than in the middle graph, but there are also no observable deviations from a uniform curve in the latter. According to the invention, such small deviations are not discernable by the human eye.

It follows that the small variation in the intensity of the second measurement curve is sufficiently suppressed so that the remaining existing speckles are no longer perceived as troublesome in the pulses of 1 ps.

Figure 6:
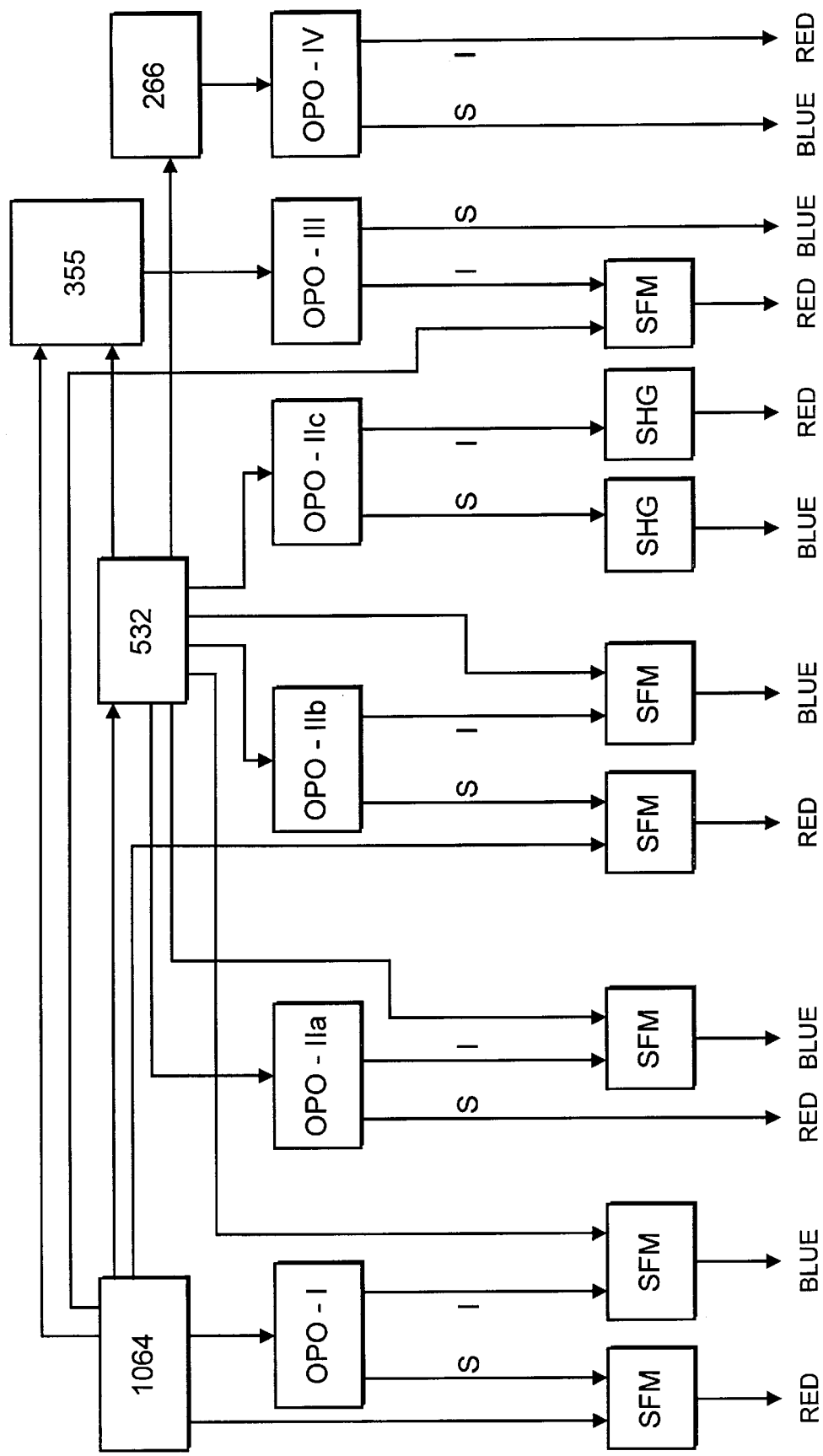
FIG. 6 is a graph showing alternative solutions for other laser sources than those shown in FIG. 2.

FIG. 6 is a schematic view of alternative solutions for generating a red or blue beam with OPO's. All of the possibilities shown in FIG. 3 provide examples showing that the OPO is excited by the fundamental wave of 1064 nm or one of the upper harmonics with 532 nm, 355 nm, 266 nm of a Nd:YVO$_4$ laser.

The exciting laser beam is fed to an OPO-I to OPO-IV, shown schematically in the drawing, which are characterized more fully in the accompanying table. The exciting laser beams generated by the latter are subsequently converted in sum frequency mixers (SFM) and frequency multipliers (SHG=second harmonic generation) into the red laser beams and blue laser beams which can be used in the laser video system. The green laser beam can be taken from the second harmonic with 532 nm of the exciting laser beam for color display of video pictures and can be obtained by frequency doubling of the fundamental wave.

The materials which can be used for the OPO's to generate the red beam and blue beam according to FIG. 6 are listed in the accompanying table. The following abbreviations are used in the table and in FIG. 6:

OPO optical parametric oscillator
SFM sum frequency mixing
S signal beam
I idler beam
SHG second harmonic generation
THG third harmonic generation
FHG fourth harmonic generation.

The usable nonlinear crystals indicated in the table by way of example were designated by the abbreviations frequently used in the prior art:

LBO=LiB$_3$O$_5$=lithium triborate
KNbO$_3$=potassium niobate
LiNbO$_3$=lithium niobate
banana=Ba$_2$NaNb$_5$O$_{15}$=barium sodium niobate
BBO=beta BaB$_2$O$_4$=beta barium borate
KTA=KTiOAsO$_4$=potassium titanium oxide arsenate
KTP=KTiOPO$_4$=potassium titanium oxide phosphate
RTP=RbTiOPO$_4$=rubidium titanium oxide phosphate
RTA=RbTiOAsO$_4$=rubidium titanium oxide arsenate
CTA=CsTiOAsO$_4$=cesium titanium oxide arsenate The first column in the table indicates the type of nonlinear process. The second column lists the used wavelengths in nanometers for the processes and the wavelengths which can be generated for red and blue.

The third column shows the usable crystals and the physical parameters for the desired wavelengths, where the angle relative to the propagation direction of the exciting laser light in the direction of the crystal axis or crystal axes is entered under "angle". "Plane" designates the principal plane of the biaxial optical nonlinear crystal. The Roman numerals I and II designate the type of phase matching, as is conventional; "o" designates the ordinary wave and "e" designates the extraordinary wave.

"Temp" designates the temperature at which the phase matching occurs. When "RT" is entered in the table for temperature, this means that the nonlinear method listed can be effected at room temperature.

The abbreviation "Fom" stands for "figure of merit". This variable is a measurement of the intensity of the nonlinear interaction. It is defined as:

$$d_{\it eff}^2/(n_1 n_2 n_3),$$

where $d_{\it eff}$ is the effective nonlinear coefficient of the crystal, and $n_1$, $n_2$ and $n_3$ represent the index of refraction of the waves in question.

The angle listed in the next column is the walk-off angle. This represents the angle of the energy flow of the new occurring wave or waves relative to the irradiation direction.

The following three columns list the acceptance widths for the respective nonlinear process with respect to wavelength, angle, and temperature. The dependence of the acceptance upon the length L of the crystal is eliminated by multiplication.

In combination with FIG. 6, the table clearly shows the multitude of possibilities for realizing the invention. The laser beams which are generated for this purpose can be used for color display of video pictures with sufficient output for a high white-light density. The overall output which must be supplied in these alternatives for acceptable laser outputs for displaying color video pictures is always within a range permitting the design of a video system without an excessive expenditure on cooling.

While the foregoing description and drawings represent the present invention, it will be obvious to those skilled in the art that various changes may be made therein without departing from the true spirit and scope of the present invention.

TABLE

RGB: Nonlinear methods, variants with Nd:YVO$_4$ ($\lambda$ = 1064 nm)

| Nonlinear process | $\lambda$ | red blue | crystal | angle [degree] | plane | Temp. [°C.] | Fom [(pm/V)$_2$] | $\rho$ [degree] | $\Delta\lambda \cdot L$ [nm · cm] | $\Delta\theta \cdot L$ [degree · cm] | $\Delta T \cdot L$ [°C. · cm] |
|---|---|---|---|---|---|---|---|---|---|---|---|
| SHG | 532 | | LBO | 0 | xyI(oo-e) | 136.1 | 0.17 | 0 | 3.7 | | 4.9 |
| " | 532 | | KNbO$_3$ | 0 | xzI(ooe) | 157.4 | 14.9 | 0 | 0.25 | | 0.3 |
| " | 532 | | LiNbO$_3$ | 90 | I(oo-e) | 132.3 | 2.6 | 0 | 0.3 | | 0.9 |
| " | 532 | | Banana | 0 | xyI(ee-o) | 107.8 | 22.3 | 0 | 0.3 | | 0.6 |
| THG | 355 | | BBO | 31.3 | I(oo-e) | RT | 0.84 | 4.1 | 0.5/0.2 | 0.007 | — |
| THG | 355 | | LBO | 37.3 | xyI(oo-e) | RT | 0.1 | 1.1 | 0.8/0.4 | 0.03 | — |
| THG | 266 | | BBO | 47.6 | I(oo-e) | RT | 0.5 | 4.9 | 0.073 | 0.005 | — |
| OPO I | 1534 + 3474 | 628/461 | KTA | 0 | xyII(e-eo) | RT | 3.1 | 0 | 2.0(S)/10.0(I) | 9.6 | — |
| " | 1571 + 3297 | 634/458 | KTP | 0 | xyII(e-eo) | RT | 3.6 | 0 | 2.0(S)/8.6(I) | 7.4 | — |
| " | 1604 + 3160 | 640/455 | RTP | 90 | xyII(e-eo) | RT | 2.0 | 0 | 1.9(S)/7.4(I) | 6.7 | — |
| " | 1690 + 2872 | 653/449 | RTP | 0 | xyII(e-eo) | RT | 3.0 | 0 | 2.5(S)/7.3(I) | 6.3 | — |
| " | 1590 + 3216 | 638/457 | RTA | 90 | xyII(e-eo) | RT | 0.9 | 0 | 2.3(S)/9.2(I) | 10.3 | — |
| " | 1628 + 3071 | 643/453 | RTA | 0 | xyII(e-eo) | RT | 2.4 | 0 | 2.5(S)/8.9(I) | 10.2 | — |
| " | 1545 + 3420 | 630/460 | KNbO$_3$ | 41.8 | xzI(e-oo) | 40.0 | 8.9 | 3.6 | 16(S)/16(I) | 0.02 | 80 |
| SFM | 1064 + 1534 | 628 | KTA | 23.6 | xyII(eo-e) | RT | 2.6 | 0.13 | 1.2/15.7 | 0.8 | — |
| " | " | " | KTP | 76.2 | xzII(oe-o) | RT | 3.2 | 1.35 | 1.4/28.3 | 0.09 | — |
| " | " | " | RTP | 32.7 | xyII(eo-e) | RT | 2.6 | 0.32 | 1.3/62.7 | 0.32 | — |
| " | " | " | LBO | 0 | xyI(oo-e) | 8.6 | 0.17 | 0 | 26/>100 | | 5.6 |
| " | " | " | LBO | 87 | xzI(ee-o) | 20.0 | 0.17 | ~0.1 | 25/>100 | 0.35 | 5.6 |
| " | " | " | KNbO$_3$ | 31.3 | xzI(oo-e) | 38.1 | 11.1 | ~3.5 | 0.5/0.74 | 0.012 | 1.6 |
| SFM | 532 + 3474 | 461 | KNbO$_3$ | 31.2 | xzI(oo-e) | 40.0 | 10.5 | ~3.5 | 0.13/1.2 | 0.012 | 1.0 |
| " | " | " | LiNbO$_3$ | 54.4 | I(oo-e) | 40.0 | 3.2 | ~2.4 | 0.2/1.6 | 0.012 | 1.1 |
| " | " | " | KTA | 43.8 | xzII(eo-o) | RT | 1.2 | 3.2 | 0.8/4.5 | 0.013 | — |
| " | " | " | CTA | 60.2 | xzII(eo-o) | RT | 1.2 | 2.3 | 0.6/3.8 | 0.07 | — |
| " | " | " | RTA | 47.7 | xzII(eo-o) | RT | 1.1 | 2.9 | 0.9/4.2 | 0.014 | — |
| " | " | " | KTP | 44.1 | xzII(eo-o) | RT | 1.5 | 3.4 | 0.9/5.3 | 0.013 | — |
| " | " | " | RTP | 47.6 | xzII(eo-o) | RT | 1.4 | 2.3 | 0.7/4.9 | 0.013 | — |
| OPOIIa | 630 + 3420 | | KTP | 42.3 | xzII(o-eo) | RT | 1.4 | 3.1 | 0.3(S)/9.9(I) | 0.016 | — |
| " | " | | RTP | 45.4 | xzII(o-eo) | RT | 1.3 | 3.0 | 0.3(S)/9.8(I) | 0.016 | — |
| " | " | | CTA | 56.9 | xzII(o-eo) | RT | 1.1 | 2.2 | 0.3(S)/7.4(I) | 0.021 | — |
| " | " | | RTA | 45.4 | xzII(o-eo) | RT | 1.1 | 2.7 | 0.3(S)/7.2(I) | 0.018 | — |
| " | " | | KTA | 41.6 | xzII(o-eo) | RT | 1.2 | 2.9 | 0.3(S)/8.0(I) | 0.017 | — |
| " | " | | KNbO$_3$ | 35.0 | xzI(e-oo) | 40.0 | 10.0 | 4.1 | 0.3(S)/1.9(I) | 0.01 | 1.4 |
| OPO IIb | 780 + 1673 | | LBO | 0 | xyI(oo-e) | 94.4 | 0.17 | 0 | 3.6(S)/12.8(I) | | 4.9 |
| " | 809.6 + 1551.5 | | LBO | 0 | xyI(oo-e) | 101.7 | 0.17 | 0 | 3.3(S)/9.2(I) | | 4.9 |
| SFM | 809.6 + 1064 | 460 | KTP | 90 | xyII(oe-e) | RT | 1.1 | 0 | 1.0/0.5 | 1.8 | — |
| SFM | 1064 + 1551.5 | 631 | KTA | 21.9 | xyII(eo-e) | RT | 2.7 | 0.12 | 1.2/17.1 | 0.8 | — |
| SFM | 780 + 1064 | 450 | KNbO$_3$ | 66.1 | xyI(oo-e) | RT | 9.4 | 2.3 | 0.2/0.3 | 0.012 | 0.25 |
| SFM | 780 + 1064 | 450 | KNbO$_3$ | 45.9 | yzI(ee-o) | RT | 12.7 | 1.1 | 0.2/0.3 | 0.028 | 0.3 |
| SFM | 780 + 1064 | 450 | BBO | 25.8 | I(oo-e) | RT | 0.95 | 3.5 | 1.5/2.1 | 0.011 | — |
| OPO IIc | 900 + 1301 | | LBO | 0 | xyI(e-oo) | 122.5 | 0.17 | 0 | 3.2(S)/5.4(I) | | 4.9 |
| " | 900 + 1301 | | KNbO$_3$ | 0–20 | xzI(e-oo) | 20–177 | 13–14.9 | 0–2.7 | 0.2(S)/0.3(I) | 0.013 | 0.3–0.7 |
| " | 900 + 1301 | | BBO | 22.6 | I(e-oo) | RT | 1.0 | 3.2 | 9.1(S)/19.0(I) | 0.015 | — |
| " | 900 + 1301 | | RTA | 41.6 | xyII(e-oe) | RT | 1.6 | 0.32 | 0.6(S)/1.3(I) | 0.18 | — |
| " | 900 + 1301 | | KTP | 67.9 | xzII(o-eo) | RT | 2.8 | 2.1 | 0.7(S)/1.5(I) | 0.03 | — |

TABLE-continued

RGB: Nonlinear methods, variants with Nd:YVO$_4$ ($\lambda$ = 1064 nm)

| Nonlinear process | $\lambda$ | red blue | crystal | angle [degree] | plane | Temp. [°C.] | Fom [(pm/V)$_2$] | $\rho$ [degree] | $\Delta\lambda \cdot L$ [nm · cm] | $\Delta\theta \cdot L$ [degree · cm] | $\Delta T \cdot L$ [°C. · cm] |
|---|---|---|---|---|---|---|---|---|---|---|---|
| " | 900 + 1301 | | RTP | 76.0 | xzII(o-eo) | RT | 2.6 | 1.4 | 0.7(S)/1.4(I) | 0.05 | — |
| " | 920.8 + 1260 | | LBO | 0 | xyI(e-oo) | 126 | 0.17 | 0 | 3.2(S)/5.0(I) | | 4.9 |
| " | 920.8 + 12600 | | KNbO$_3$ | 0–20 | xzI(e-oo) | 20–172 | 13–14.9 | 0–2.7 | 0.2(S)/0.3(I) | 0.013 | 0.3–0.7 |
| " | 920.8 + 1260 | | BBO | 22.6 | I(e-oo) | RT | 1.0 | 3.2 | 11.1(S)/20.7(I) | 0.015 | — |
| " | 920.8 + 1260 | | RTA | 53.5 | xyII(e-oe) | RT | 1.3 | 0.31 | 0.7(S)/1.2(I) | 0.19 | — |
| " | 920.8 + 1260 | | KTA | 70.0 | xzII(o-eo) | RT | 2.9 | 2.0 | 0.7(S)/1.4(I) | 0.04 | — |
| " | 920.3 + 1260 | | RTP | 79.7 | xzII(o-eo) | RT | 2.7 | 1.0 | 0.7(S)/1.3(I) | 0.07 | — |
| SHG | 900 => 450 | 450 | KNbO$_3$ | 90 | xyI(oo-e) | 100.8 | 10.9 | 0 | 0.11 | | 0.17 |
| " | 920.8 => 460 | 460.4 | KNbO$_3$ | 90 | xyI(oo-e) | 129.1 | 11.0 | 0 | 0.13 | | 0.16 |
| " | 1260 => 630 | 630 | KNbO$_3$ | 31.0 | xzI(oo-e) | 40 | 12.0 | 3.5 | 0.6 | 0.01 | |
| " | " | 630 | BBO | 20.7 | I(oo-e) | RT | 1.1 | 2.9 | 5.5 | 0.02 | |
| " | " | 630 | LBO | 0 | xzII(Oe-e) | 14.7 | 0.12 | 0 | 5.0/4.5 | 9.5 | |
| " | " | 630 | RTA | 81.8 | xzII(oe-o) | RT | 2.3 | 0.7 | 1.2 | 0.14 | |
| " | " | 630 | KTA | 67.0 | xzII(oe-o) | RT | 2.4 | 2.0 | 1.2 | 0.05 | |
| " | " | 630 | KTP | 63.1 | xzII(oe-o) | RT | 2.6 | 2.4 | 1.5 | 0.04 | |
| " | " | 630 | RTP | 69.5 | xzII(oe-o) | RT | 25 | 1.8 | 1.4 | 0.06 | |
| OPO III | 450 + 1682 | 450 | BBO | 27.4 | I(oo-e) | RT | 0.9 | 3.8 | 0.2(S)/3.1(I) | 0.008 | |
| " | 450 + 1682 | 450 | LBO | 27.2 | xyI(oo-e) | 40 | 0.08 | 0 | 0.4(S)/1.9(I) | | 5.1 |
| " | 450 + 1682 | 450 | LBO | 0 | xzII(e-oe) | ~150 | ~0.11 | 0 | ~1.5(S)/~1.5(I) | | ~3 |
| OPO IV | 460 + 631 | | BBO | 46.9 | I(oo-e) | RT | 0.5 | 4.9 | 0.4(S)/0.8(I) | 0.005 | |

What is claimed is:

1. In a process for generating at least three laser beams of different wavelengths for displaying color video pictures in which every laser beam is controlled in intensity for generating a monochromatic partial image, and these monochromatic partial images are mixed additively for displaying the color video pictures, wherein at least one of the three laser beams is obtained in that a medium is excited by at least a partial beam of an exciting primary laser with a defined wavelength, which the medium, upon excitation, emits an excited laser beam with a different wavelength than the wavelength of the exciting primary laser, and wherein the exciting primary laser beam and the excited laser beam are used directly or after frequency conversion for the display of monochromatic partial images, the improvement comprising the steps of:

using a pulsed laser as the exciting primary laser;
   using the material with nonlinear optical characteristics as a medium, wherein the material, in addition to the excited laser beam generated by excitation, releases an additional laser beam whose frequency is given by the sum or difference frequencies of the exciting primary laser beam and the excited laser beam; and
   using the laser beams emitted by the medium and the exciting primary laser beam directly as laser beams for the display of monochromatic partial images or converting them into the laser beams for the display of monochromatic partial images.

2. The process according to claim 1, wherein the exciting primary laser is pulsed at a pulse duration of less than 100 ps.

3. The process according to claim 1, including the step of selecting the exciting primary laser, with respect to its wavelength, and the medium so that when assigning the colors red, green and blue to the wavelengths of the three laser beams which are generated for displaying the monochromatic partial images, the wavelength of the generated blue laser beam is between 400 nm and 470 nm, the wavelength of the generated green laser beam lies in the range of 520 nm to 540 nm, and the wavelength of the generated red laser beam is less than 635 nm, wherein the outputs of the laser beams over the pulse duration with the colors red and blue do not deviate by more than 30% from the output of the green laser beam.

4. The process according to claim 1, wherein excitation is effected via the fundamental frequency or an upper harmonic of a mode-coupled Nd:YLF laser or Nd:YVO$_4$ laser.

5. The process according to claim 1, further comprising the steps of selecting the material for the medium, positioning the medium and mirrors, and phase-matched coupling in of the exciting primary laser beam and the excited laser beam, the steps of selecting the material, positioning and phase-matched coupling being effected so as to result in the design of an optical parametric oscillator.

6. The process according to claim 1, wherein the temperature of the medium is regulated.

7. The process according to claim 6, wherein the wavelength of the excited laser beam is adjusted via the temperature of the medium.

8. The process according to claim 1, wherein the exciting laser beam and/or the laser beams generated in the medium by the exciting laser beam are frequency-multiplied or frequency-summed with another laser beam for conversion.

9. The process according to claim 1, wherein the pulse duration of the exciting primary laser beam is so adjusted that the generated wavelength spectrum in the excited laser beam cancels out interference of the excited laser beam with itself.

10. The process according to claim 9, wherein the monochromatic partial images are generated by sequential rastering of the image as image points at a predetermined image point frequency and the pulses of the exciting primary laser beam are repeated at a repetition frequency which is an integral multiple of the image point frequency.

11. An apparatus for generating at least three laser beams of different wavelengths for the display of color video pictures, comprising:

a control device for controlling three laser beams for generating monochromatic partial images which are mixed additively for displaying a color video picture;
   a primary laser for producing an exciting laser beam; and
   a medium excitable by the primary laser to produce an excited laser beam, wherein the exciting laser beam and the excited laser beam are used directly or after frequency conversion for displaying monochromatic partial images;

said primary laser being operated in a pulsed manner so that its light output is released in a pulse; and said medium being a material with nonlinear optical characteristics which, in addition to the laser beam excited by the exciting laser beam, also releases another laser beam whose frequency is given by the nonlinear optical characteristics of the material as a sum or difference frequency of the exciting laser beam and excited laser beam.

12. The apparatus according to claim 11, wherein mirrors are provided for the phase-matched coupling in of the exciting laser beam and the excited laser beam relative to the medium, the medium is a nonlinear optical crystal, and the crystal and mirrors are arranged, with reference to the primary laser, in the manner of an optical parametric oscillator.

13. The apparatus according to claim 11, wherein a regulating device is provided for regulating the temperature of the medium.

14. The apparatus according to claim 13, wherein the regulating device is adjustable with respect to the temperature to be regulated and the wavelength of the laser beam which is excited by the medium is not dependent upon temperature.

15. The apparatus according to claim 11, wherein frequency multipliers or sum frequency mixers are provided for converting the exciting laser beam and excited laser beam.

16. The apparatus according to claim 11, wherein a deflection device is provided for generating the monochromatic partial images in an image point raster with an image point frequency and a pulse device is provided for the primary laser which pulses the laser at a repetition frequency which is an integral multiple of the image point frequency.

17. The apparatus according to claim 11, wherein a self-modulating optical medium is provided in at least one of the light paths of one of the three laser beams.

* * * * *